United States Patent [19]

Yamane

[11] Patent Number: 5,040,506
[45] Date of Patent: Aug. 20, 1991

[54] AIR INTAKE QUANTITY CONTROLLER FOR ENGINE

[75] Inventor: Kouichi Yamane, Hyogo, Japan

[73] Assignee: Mitsubishi Denki K.K., Tokyo, Japan

[21] Appl. No.: 533,553

[22] Filed: Jun. 5, 1990

[30] Foreign Application Priority Data

Jun. 14, 1989 [JP] Japan ................................ 1-152656

[51] Int. Cl.$^5$ .............................................. F02D 9/06
[52] U.S. Cl. .................................................. 123/327
[58] Field of Search ...................... 123/327, 493, 58 J, 123/492, 339, 587, 341

[56] References Cited

U.S. PATENT DOCUMENTS

| | | | |
|---|---|---|---|
| 4,444,167 | 4/1984 | You | 123/327 |
| 4,700,679 | 10/1987 | Otobe et al. | 123/327 |
| 4,709,674 | 12/1986 | Bianchi et al. | 123/327 |

FOREIGN PATENT DOCUMENTS

1-4063  1/1989  Japan ................................ 123/327

Primary Examiner—Raymond A. Nelli
Attorney, Agent, or Firm—Sughrue, Mion, Zinn, Macpeak & Seas

[57] ABSTRACT

An air intake quantity controller for an engine having a control unit for effecting control such that the quantity of auxiliary air is increased to cope with a decelerating condition that occurs when a throttle valve is changed from an open state to a closed state. The control unit inhibits the control operation of increasing the quantity of auxiliary air if either an engine parameter which is proportional to the load on the engine or the engine load is not greater than a predetermined quantity when the throttle valve is in an open state. Thus, when the change in the engine load is relatively small at the time when the throttle valve shifts from an open state to a closed state, the control unit inhibits the control operation of increasing the quantity of auxiliary air, thereby preventing an unnecessary rise in the engine speed.

5 Claims, 7 Drawing Sheets

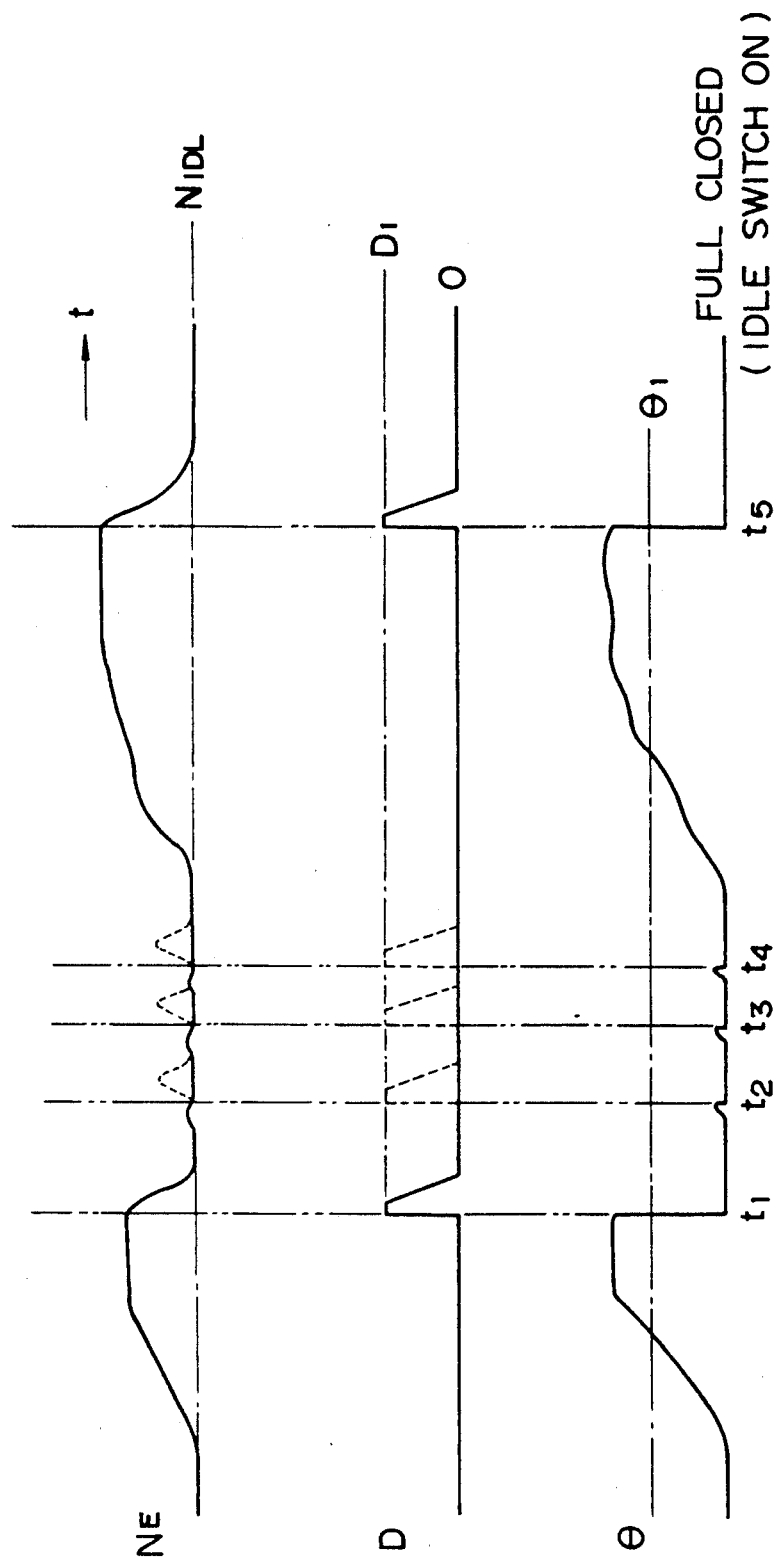

AIR INTAKE QUANTITY CONTROLLER FOR ENGINE

BACKGROUND OF THE INVENTION

1. Field of the Invention

The present invention relates to an air intake quantity controller for an engine which is mounted on a vehicle. More particularly, the present invention relates to the control of the quantity of auxiliary air that is supplied to such an engine through a bypass intake passage which bypasses a throttle valve.

2. Description of the Prior Art

A typical conventional air intake quantity controller for an engine is disclosed, for example, in Japanese Patent Post-Exam. Publication No. 64-4063 (1989). Hitherto, when a throttle valve that is associated with an engine shifts from an open state to a closed state, the quantity of intake air becomes insufficient, which results in the engine speed becoming lower than the idle speed or an increase in the content of harmful components (CO and HC) in exhaust gas, which are generated when the engine speed is reduced. In order to prevent a lowering of the engine speed and thereby reduce the content of harmful components in exhaust gas, the prior art is designed to increase the amount of auxiliary air passing through a bypass intake passage to cope with an engine decelerating condition from the time when an idle switch, for example, which detects whether or not the throttle valve is fully or substantially fully closed, i.e., whether or not it is in an idling position, changes from an "off" state to an "on" state. This control is effected by temporarily increasing the opening of an electrically-operated air control valve in excess of an ordinary basic control quantity, the control valve being provided in a bypass intake passage that bypasses the throttle valve.

The conventional air intake quantity controller for an engine suffers, however, from the following problems:

If the driver, for some reason, repeats an operation in which the accelerator pedal, which is in a released position, is slightly depressed and immediately released thereafter when the engine is in an idling condition, the throttle valve is slightly opened and then closed in response to the operation of the accelerator pedal and consequently the idle switch repeatedly changes from an "off" state to an "on" state. Since the opening of the air control valve is temporarily increased every time the idle switch changes, the increase in the opening of the air control valve is repeated. Thus, the quantity of auxiliary air that is sucked into the engine is repeatedly increased, causing the engine speed to rise to a level high above the idle speed.

SUMMARY OF THE INVENTION

In view of the above-described problems of the prior art, it is an object of the present invention to provide an air intake quantity controller for an engine which is capable of eliminating an abnormal rise in engine speed by inhibiting the control operation of temporarily increasing the quantity of auxiliary air, in accordance with an engine parameter which is proportional to the load on the engine or the engine load condition.

To this end, the present invention provides an air intake quantity controller for an engine having a control unit for effecting control such that the quantity of auxiliary air is increased to cope with a decelerating condition that occurs when a throttle valve is changed from an open state to a closed state, wherein the control unit inhibits the control operation of increasing the quantity of auxiliary air if either an engine parameter which is proportional to the load on the engine or the engine load is not greater than a predetermined quantity when the throttle valve is in an open state.

According to the present invention, when the change in the engine load is relatively small at the time when the throttle valve shifts from an open state to a closed state, the control unit inhibits the control operation of increasing the quantity of auxiliary air, thereby preventing an unnecessary rise in the engine speed.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which:

FIG. 7 is a waveform chart showing the operation timing according to the embodiment of the present invention and the operation timing according to the prior art.

DESCRIPTION OF THE PREFERRED EMBODIMENT

One embodiment of the present invention will be described below with reference to the accompanying drawings.

Figure 1:
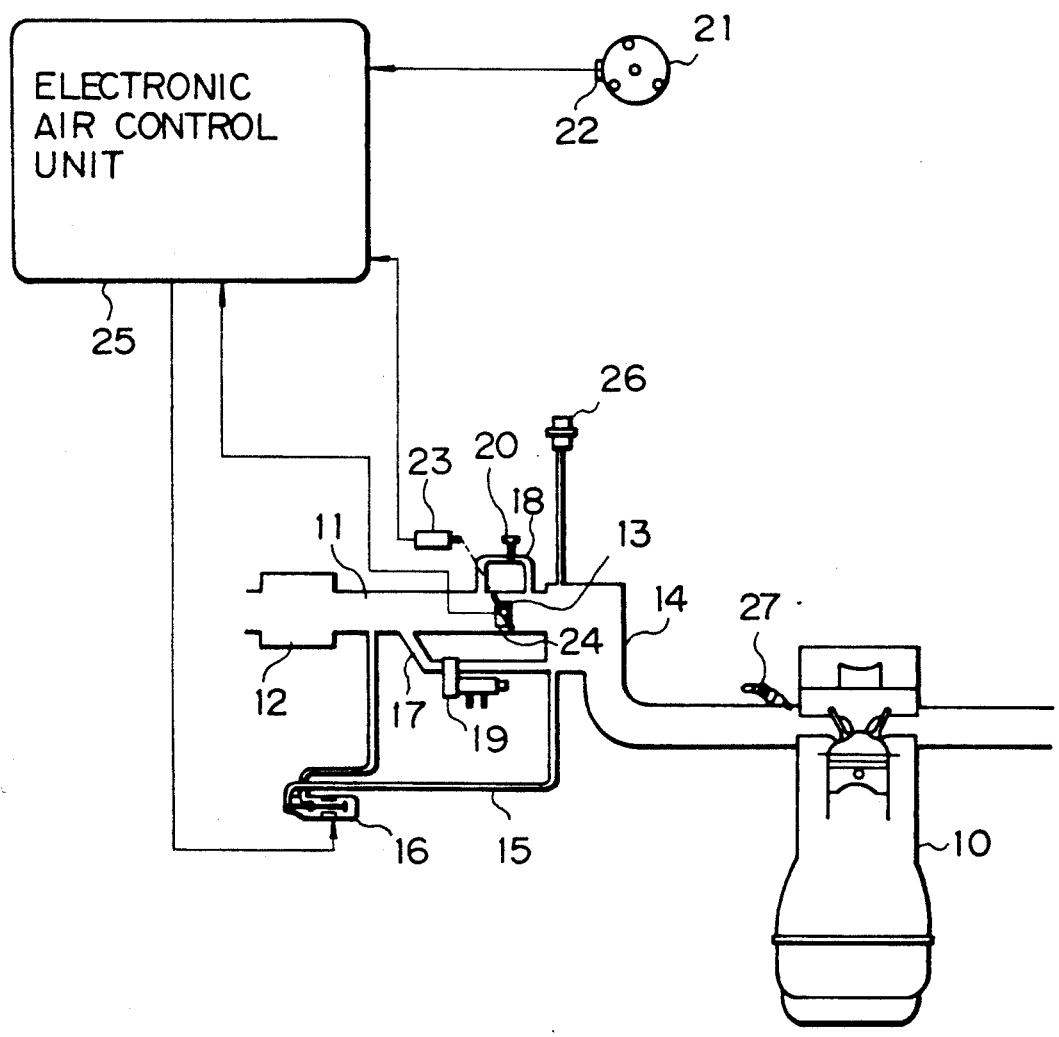
FIG. 1 is a block diagram showing one embodiment of the present invention.

Referring to FIG. 1, which is a block diagram showing the arrangement of one embodiment of the engine air intake quantity controller according to the present invention, reference numeral 10 denotes a well-known 4-cycle spark ignition engine which is mounted on a vehicle, for example, an automobile, and 11 denotes an intake passage of the engine 10. In the intake passage 11 are provided an air cleaner 12, a throttle valve 13 which is activated in response to the operation of stepping on an accelerator pedal, and a surge tank 14 in the mentioned order from the upstream side. A main bypass intake passage 15 connects together two portions of the intake passage 11, which are respectively upstream and downstream of the throttle valve 13, that is, bypasses the throttle valve 13. The main bypass intake passage 15 is provided with a solenoid control valve (i.e., solenoid-operated air control valve) 16 as on example of an electrically-operated air control valve that controls the cross-sectional area of the flow path of the main bypass intake passage 15. The solenoid control valve 16 is arranged such that the opening thereof is controlled in accordance with the duty ratio of a driving signal that is applied thereto; the higher the duty ratio, the larger the opening. In addition, there are provided a fast-idle bypass passage 17 and an auxiliary bypass intake passage 18, which bypass the throttle valve 13 in the same way as the main bypass intake passage 15. The fast idle bypass passage 17 is provided with a well-known fast-idle valve 19 of a thermowax type, which automatically controls the cross-sectional area of the flow path of the fast-idle bypass passage 17 in accordance with the temperature of water for cooling the engine 10. The opening of the fast-idle valve 19 is inversely proportional to the cooling water temperature. The auxiliary bypass intake passage 18 is provided with an idle adjusting screw 20 which controls the cross-sectional area of the flow path of the auxiliary bypass intake passage 18. The idle adjusting screw 20 is manually adjusted by a worker when adjusting the idle speed.

A crank angle sensor 22 is attached to a distributor 21 that is including in an igniter for the engine 10. The sensor 22 generates an angle pulse every time the crankshaft of the engine 10 rotates through a predetermined angle.

An idle switch 23 detects whether or not the throttle valve 13 is in an idling position, i.e., a full-closed position. When detecting that the throttle valve 13 is fully closed, the idle switch 23 changes from an "off" state to an "on" state. A throttle opening sensor 24 detects the opening $\theta$ of the throttle valve 13 and outputs an analog detecting signal the magnitude of which corresponds to the degree of throttle opening $\theta$.

Figure 2:
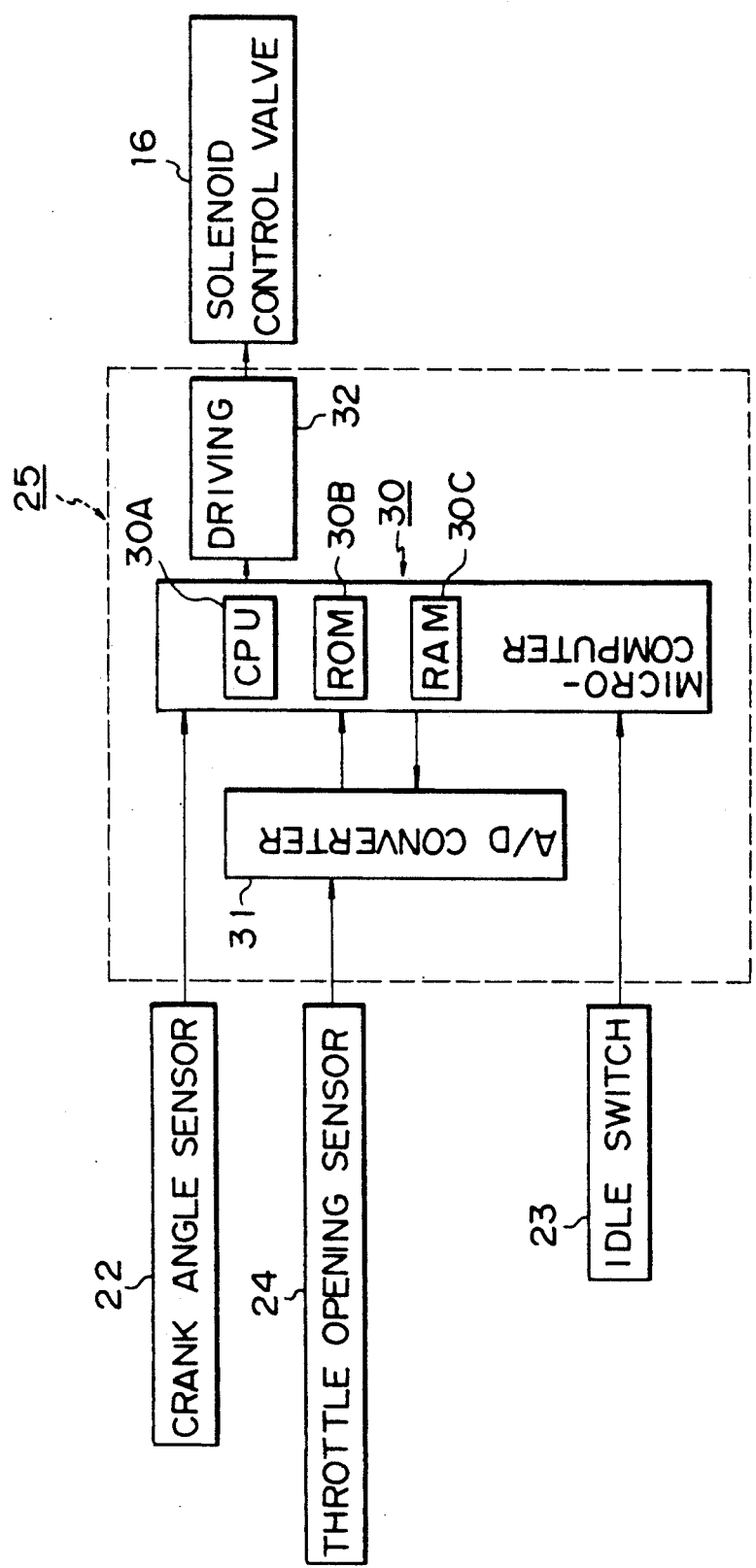
FIG. 2 is a block diagram of the electronic air control unit in the arrangement shown in FIG. 1.

An electronic air control unit 25 is, as shown in FIG. 2, supplied with output signals from the crank angle sensor 22, the idle switch 23 and the throttle opening sensor 24 to process the input signals according to a predetermined processing procedure and controls the opening of the solenoid control valve 16 on the basis of the result of the processing.

As is well known, the pressure inside the intake passage 11 at the downstream side of the throttle valve 13 is detected by a pressure sensor 26 that detects the pressure inside the surge tank 14, that is, the pressure inside the intake pipe. An engine speed is detected on the basis of the intake pipe pressure that is detected by the pressure sensor 26 and angle pulses that are delivered from the crank angle sensor 22, and an amount of fuel which corresponds to the detected engine speed is supplied to the engine 10 from a fuel injection valve 27 that is provided for each cylinder. It should be noted that the fuel injection valve 27 is driven by a fuel control system (not shown). Accordingly, it is possible to control the rotational speed of the engine 10 by controlling the quantity of intake air by means of the throttle valve 13 or the solenoid control valve 16.

FIG. 2 shows the arrangement of the electronic air control unit 25 shown in FIG. 1. The control unit 25 comprises a microcomputer 30 which executes processing of various input data, an A/D converter 31 which converts an analog input signal into a digital signal and inputs the converted signal to the microcomputer 30, and a driving circuit 32 which amplifies a duty-controlled driving signal from the microcomputer 30 and supplies the amplified signal to the solenoid control valve 16.

The microcomputer 30 comprises a CPU 30A which executes various kinds of computations and judgements, a ROM 30B which is stored with flowcharts shown in FIGS. 3 to 6 in the form of programs, and a RAM 30C which is used as a work memory.

Angle pulses from the crank angle sensor 22 are inputted to the microcomputer 30 and used to compute an engine speed on the basis of the period of the pulses. An analog detecting signal from the throttle opening sensor 24 is read into the microcomputer 30 after being converted into a digital signal representative of a throttle opening value $\theta$ in the A/D converter 31. An ON/OFF signal from the idle switch 23 is inputted to the microcomputer 30 as it is.

Figure 3:
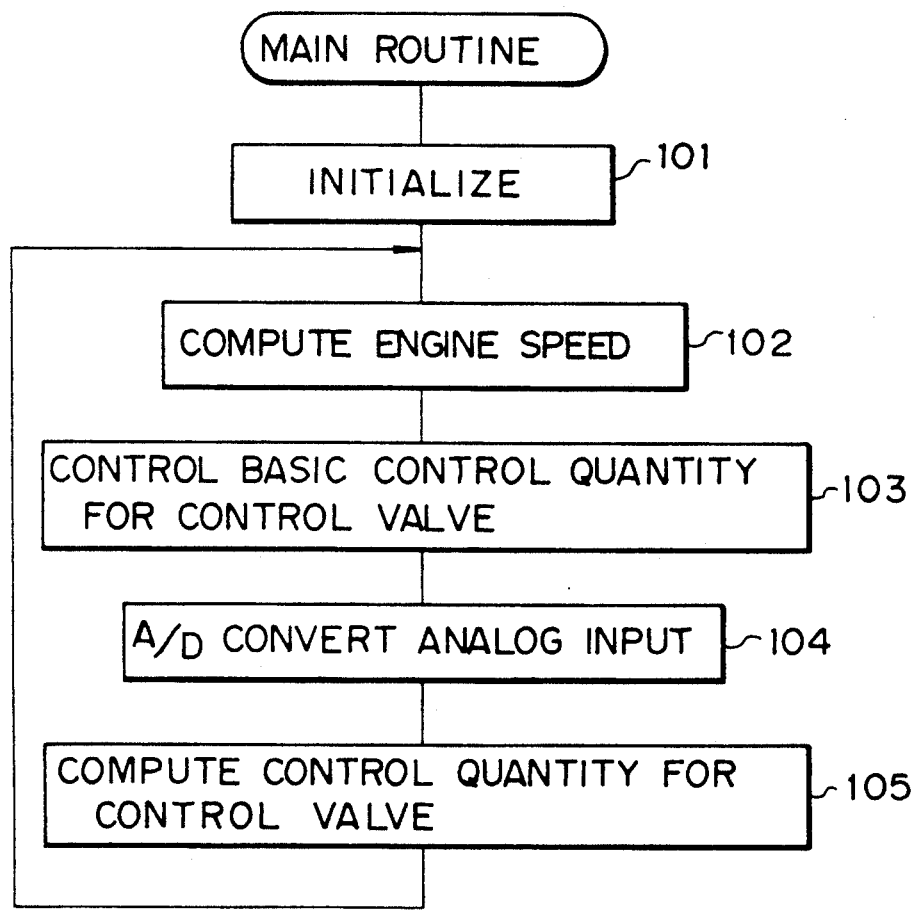
FIGS. 3 to 6 are flowcharts showing the operation of one embodiment of the present invention.
Figure 4:
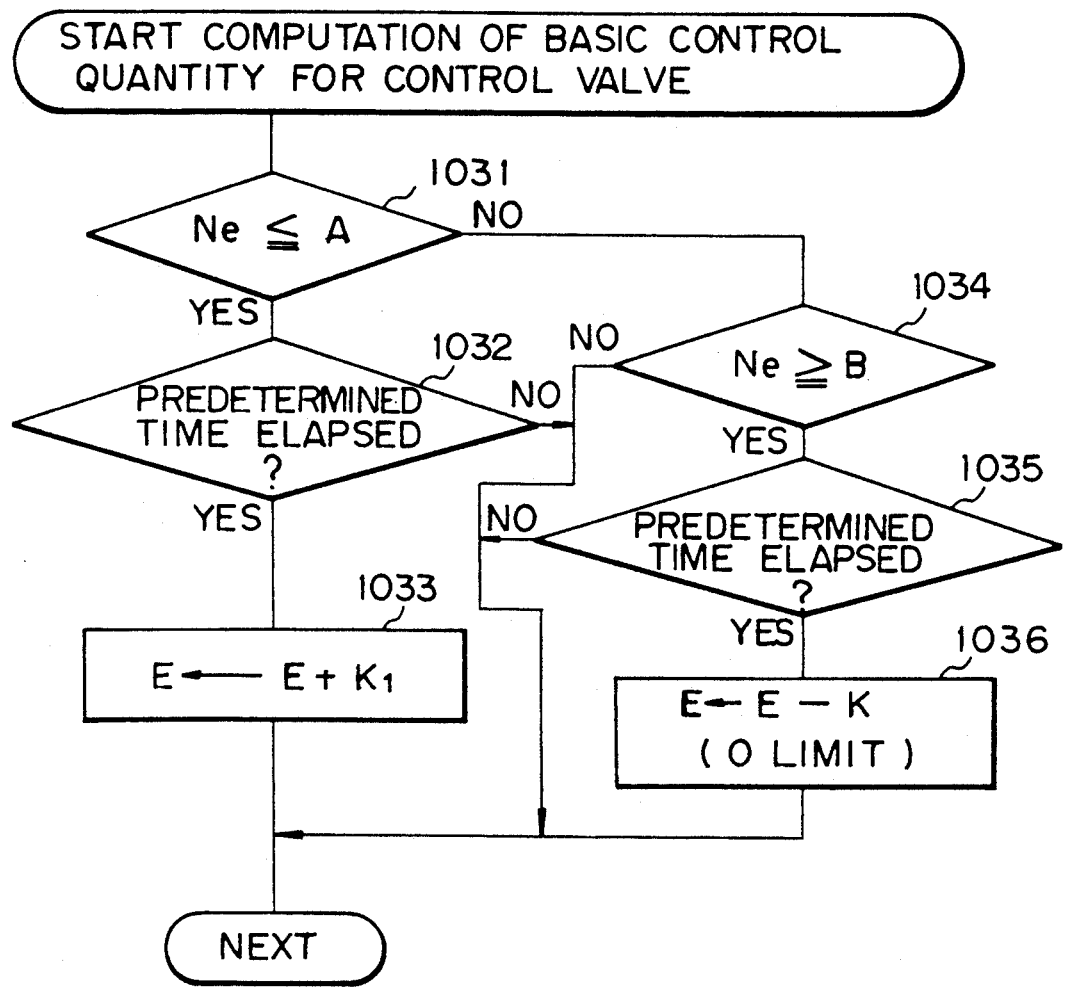
Figure 5:
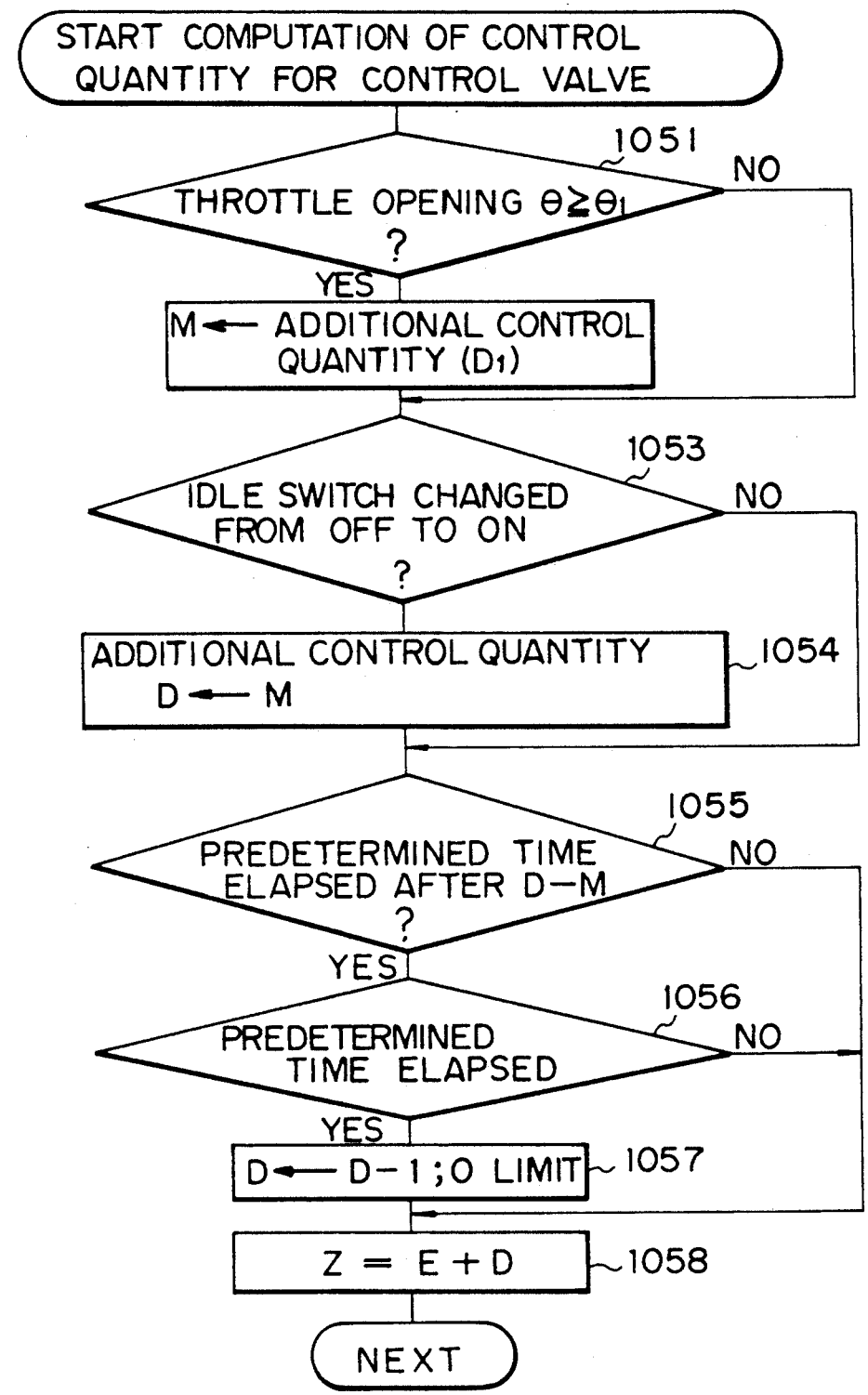

FIG. 3 shows a main routine for computation of a control quantity for the solenoid control valve 16 according to this embodiment. First, initialization is executed in Step 101, and engine speed data $N_e$ ($\alpha N_E$) representative of an engine speed $N_E$ is then computed on the basis of the period of angle pulses from the crank angle sensor 22 in Step 102. The period of angle pulses is computed by an interrupt routine (not shown) which is initiated every time an angle pulse signal is generated. Then, the processing shown in FIG. 4 is executed to compute a basic control quantity for the solenoid control valve 16 which corresponds to the engine speed $N_E$ in Step 103. Then, a throttle opening value $\theta$ ($\alpha$ the throttle opening $\theta$) that is obtained by converting the output signal from the throttle opening sensor 24 into a digital form is read in Step 104. Then, the processing shown in FIG. 5 is executed to compute an additional control quantity for the solenoid control valve 16 in accordance with the size of the throttle opening value $\theta$ and the state of the idle switch 23, and a control quantity for the solenoid control valve 16 is obtained by adding together the basic and additional control quantities in Step 105. After the execution of Step 105, the process returns to Step 102 to repeat the above-described operation.

The process of computing a basic control quantity for the solenoid control valve 16 will next be explained with reference to FIG. 4. It is first judged in Step 1031 whether or not the engine speed data $N_e$ is equal to or smaller than a predetermined value A, that is, whether or not the engine speed $N_E$ is equal to or smaller than the number of revolutions which is equivalent to the value A. If YES, it is then judged in Step 1032 whether or not a predetermined time has elapsed after the preceding computation of a basic control quantity E. If NO, the processing of FIG. 4 is ended, whereas, if YES, a first control value $K_1$ is added to the previous basic control quantity E determined a predetermined time before to update E (it should be noted that the upper limit of E is a duty ratio of 100%). Normally, the updated basic control quantity E causes the opening of the solenoid control valve 16 to increase by an amount corresponding to $K_1$ in comparison to the previous basic control quantity.

On the other hand, if the engine speed data $N_e$ is judged to be greater than the value A in Step 1031, it is then judged in Step 1034 whether or not the data $N_e$ is equal to or greater than a second predetermined value B. If NO, the processing of FIG. 4 is ended, whereas, if YES, it is then judged in Step 1035 whether or not a predetermined time has elapsed after the preceding computation of a basic control quantity E. If NO, the processing of FIG. 4 is ended, whereas, if YES, a second control value $K_2$ is subtracted from the previous basic control quantity E determined a predetermined time before to update E (it should be noted that the lower limit of E is a duty ratio of 0%). Normally, the updated basic control quantity E causes the opening of the solenoid control valve 16 to decrease by an amount corresponding to $K_2$ in comparison to the previous basic control quantity. After the execution of either Step 1033 or 1036, the processing of FIG. 4 is ended. Assuming that a value which corresponds to the idle speed $N_{IDL}$ is represented by IDL, the relationship of $A < IDL < B$ is valid. The difference between B and A is equivalent to, for example, several tens of revolutions per minute.

The process of computing a control quantity for the solenoid control valve 16 will next be explained with reference to FIG. 5. It is first judged in Step 1051 whether or not the throttle opening value $\theta$ is equal to or greater than an opening value $\theta_1$ which has previously been set and stored for control quantity generation judgement, that is, whether or not the throttle opening $\theta$ of the throttle valve 13 is equal to or greater than a predetermined throttle opening $\theta_1$. If YES, an initial value $D_1$ for an additional control quantity which has previously been set and stored in the ROM 30B for temporarily increasing the quantity of auxiliary air is transferred to a first storage position in the RAM 30C and defined as an additional control quantity M in Step 1052. If NO is the answer in Step 1051 or after the execution of Step 1052, the process proceeds to Step 1053, in which it is judged whether or not the idle switch 23 has changed from an "off" state to an "on" state. If YES, the additional control quantity M is transferred to an additional control quantity storage memory (e.g., a second storage position in the RAM 30C) and defined as an additional control quantity D in step 1054. If NO is the answer in Step 1053 or after the execution of Step 1054, the process proceeds to Step 1055, in which it is judged whether or not a predetermined time has elapsed after the execution of Step 1054. If YES, it is then judged in Step 1056 whether or not a predetermined time has elapsed after the preceding computation of a control quantity Z. If YES, 1 is subtracted from the additional control quantity D to update D (the lower limit: 0) in Step 1057, and the process then proceeds to Step 1058. Even if NO is the answer in either Step 1055 or 1056, the process proceeds to Step 1058. In Step 1058, a control quantity Z for the solenoid control valve 16 is obtained by adding together the basic control quantity E and the additional control quantity D, thus completing the processing of FIG. 5. It should be noted that Z, E and D all represent duty ratios.

Figure 6:
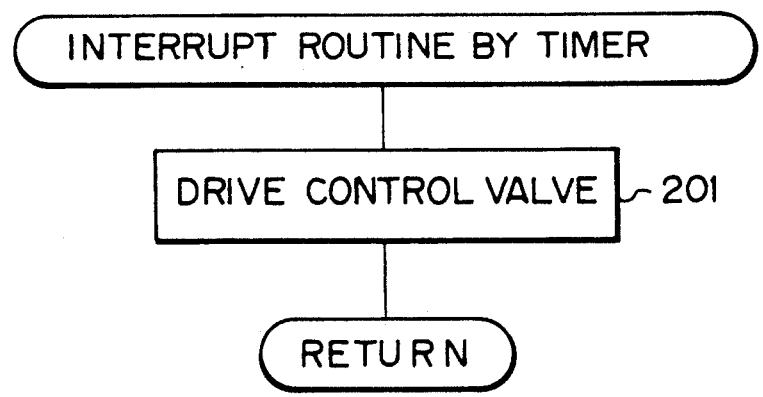

If an interrupt signal, which is generated every predetermined time by a timer, occurs during execution of the main routine shown in FIG. 3, the execution of the main routine is suspended immediately and an interrupt routine that is shown in FIG. 6 is executed instead. In Step 201, a driving signal having a duty ratio corresponding to the control quantity Z is delivered is delivered to the solenoid control valve 16 through the driving circuit 32 to drive the control valve 16, and the process then returns to the main routine.

FIG. 7 is a waveform chart showing changes of the engine speed $N_E$, additional control quantity D and throttle opening value $\theta$ with time t (abscissa axis). In the prior art, as shown by the chain lines in the chart, if the throttle valve is slightly opened and closed repeatedly, as shown, by $t_2$, $t_3$ and $t_4$, when the throttle valve is fully closed and the engine speed $N_E$ converges on the idle speed $N_{IDL}$, the additional control quantity $D_1$ is generated every time the throttle valve is slightly opened and closed, so that the quantity of auxiliary air is temporarily increased every time the additional control quantity $D_1$ is generated and hence the engine speed $N_E$ rises by a large margin. In this embodiment, however, the throttles opening value $\theta$ when the throttle valve is opened is not greater than the throttle opening value $\theta_1$ for control quantity generation judgement, as shown by the solid line in the chart. Accordingly, no additional control quantity $D_1$ is generated at $t_2$, $t_3$ and $t_4$ and hence the engine speed $N_E$ does not substantially rise but stably converges nearly on the idle speed $N_{IDL}$.

The initial value $D_1$ for the additional control quantity is set only at the time $t_1$ and $t_5$ because the throttle opening value $\theta$ therebefore is greater than the control quantity generation judgement throttle opening value $\theta_1$. Thereafter, the control quantity is gradually reduced to zero. Thus, the quantity of auxiliary air is increased when the engine is brought into a decelerating condition by fully closing the throttle valve, so that the engine speed $N_E$ does not fall lower than the idle speed $N_{IDL}$ but smoothly shifts to it.

As has been described above, according to the present invention, the control operation of increasing the quantity of auxiliary air, which is conducted to cope with a decelerating condition that occurs when the throttle valve is closed, is inhibited if an engine parameter which is proportional to the load on the engine or the engine load is not greater than a predetermined quantity when the throttle valve is in an open state. Accordingly, even if the driver repeats an operation in which the throttle valve is slightly opened and closed immediately thereafter, it is possible to prevent the engine speed from rising high above the idle speed.

Although the present invention has been described through specific terms, it should be noted here that the described embodiment is not necessarily exclusive and that various changes and modifications may be imparted thereto without departing from the scope of the invention which is limited solely by the appended claim.

What is claimed is:

1. An air intake quantity controller for an engine having a bypass intake passage which bypasses a throttle valve to supply auxiliary air to said engine, an electrically-operated air control valve for controlling the quantity of auxiliary air passing through said bypass intake passage, said air intake quantity controller comprising: a crank angle sensor for outputting angle pulses, an idle switch means for outputting a signal representative of whether said throttle valve is in an idling position, such that said idle switch means switches from an off state to an on state when said throttle valve is fully closed, a throttle opening sensor for outputting an opening value $\theta$ of said throttle valve, and a control means responsive to said outputs of said crank angle sensor, said idle switch means and said throttle opening sensor for effecting a control operation of increasing the quantity of said auxiliary air to compensate for a decelerating condition that occurs when said idle switch means changes from said off state to said on state, wherein said control means inhibits said control operation of increasing the quantity of auxiliary air if either an engine parameter which is proportional to the load on said engine or said engine load is not greater than a predetermined quantity when said output of said throttle valve opening sensor is greater than a predetermined value.

2. The air intake controller as claimed in claim 1, wherein said air control valve is a solenoid control valve.

3. A method for controlling an air intake quantity controller for an engine having a bypass intake passage which bypasses a throttle valve to supply auxiliary air to said engine, an electrically-operated air control valve for controlling the quantity of auxiliary air passing through said bypass intake passage, a crank angle sensor for outputting angle pulses, an idle switch means for outputting a signal representative of whether said throttle valve is in an idling position, such that said idle switch means switches from an off state an on state when said throttle valve is fully closed, a throttle opening sensor for outputting an opening value θ of said throttle valve, said method comprising the steps of:
a. detecting a period of angle pulses from said crank angle sensor;
b. computing an engine speed of said engine on the basis of said period of angle pulses;
c. computing a basic control quantity corresponding to said engine speed;
d. detecting said opening value θ of said throttle opening sensor;
e. detecting whether said idle switch is in said off state or said on state;
f. computing an additional control quantity corresponding to said opening value θ of said throttle opening valve and said state of said idle switch;
g. computing a total control quantity by adding said basic control quantity to said additional control quantity;
h. outputting a driving signal having a duty ratio proportional to said total control quantity for controlling said air control valve; and
i. repeating said steps (a) through (h).

4. The method as claimed in claim 3, wherein the computation of said basic control quantity comprises the steps of:
a. comparing said engine speed with a first and second predetermined value representing engine speeds of said engine, said first predetermined value being less than said second predetermined value;
b. if said engine speed is less than or equal to said first predetermined value then increase said basic control quantity by a first predetermined amount;
c. if said engine speed is greater than or equal to said second predetermined value then decrease said basic control quantity by a second predetermined amount; and
d. if said engine speed is between said first and second predetermined value then said basic control quantity retains its previous value.

5. The method as claimed in claim 3, wherein the computation of said additional control quantity comprises the steps of:
a. setting a first initial control quantity (M) to a first predetermined value;
b. comparing said opening value θ of said throttle valve sensor with a predetermined opening value, if said opening value θ is greater than or equal to said predetermined opening value then increase said first initial control quantity (M) to a first predetermined initial value and go to step (c), if said opening value θ is less than said predetermined opening value then go to step (c);
c. determining if said idle switch changed from said off state to said on state, if said idle switch changed from said off state to said on state then set a second initial control quantity (D) to said second initial control quantity (M) and go to step (d), if said idle switch did not change from said off state to said on state then go to step (d);
d. determining whether a predetermined time has elapsed, if said predetermined time has elapsed then subtract from said second initial control quantity (D) a predetermined value and go to step (e), if said predetermined time has no elapsed then go to step (e); and
e. setting said additional control quantity to said second initial control quantity (D).

* * * * *